United States Patent
Iio et al.

[19]

[11] Patent Number: 6,068,769
[45] Date of Patent: May 30, 2000

[54] AQUEOUS DISPERSION SLURRY OF INORGANIC PARTICLES AND PRODUCTION METHODS THEREOF

[75] Inventors: Akira Iio, Yokkaichi; Masayuki Hattori, Aichi; Masayuki Motonari, Yokkaichi, all of Japan

[73] Assignee: JSR Corporation, Tokyo, Japan

[21] Appl. No.: 09/135,840

[22] Filed: Aug. 18, 1998

[30] Foreign Application Priority Data

Aug. 19, 1997 [JP] Japan ................................. 9-238869
Apr. 13, 1998 [JP] Japan ................................ 10-100862
Jul. 7, 1998 [JP] Japan ................................ 10-191443

[51] Int. Cl.$^7$ ........................ B01D 24/00; B01D 37/00; C04B 33/00; B03B 1/00
[52] U.S. Cl. ..................... 210/315; 210/806; 306/288; 516/81; 516/88; 516/90; 516/93; 501/146; 209/5
[58] Field of Search .............................. 366/288; 516/81, 516/88, 90, 93; 210/315, 806; 501/146; 209/5

[56] References Cited

U.S. PATENT DOCUMENTS

| | | |
|---|---|---|
| 5,114,537 | 5/1992 | Scott et al. . |
| 5,116,535 | 5/1992 | Cochrane . |
| 5,308,508 | 5/1994 | Womack . |
| 5,391,258 | 2/1995 | Brancaleoni et al. . |
| 5,417,855 | 5/1995 | Gershenson ........................ 210/315 |

FOREIGN PATENT DOCUMENTS

| | | |
|---|---|---|
| 0 350 665 | 1/1990 | European Pat. Off. . |
| 0 499 661 | 8/1992 | European Pat. Off. . |
| 0 520 109 | 12/1992 | European Pat. Off. . |
| 0 530 926 | 3/1993 | European Pat. Off. . |
| 0 684 638 | 11/1995 | European Pat. Off. . |
| 0 708 160 | 4/1996 | European Pat. Off. . |
| 0 773 270 | 5/1997 | European Pat. Off. . |
| 40 06 392 | 9/1990 | Germany . |
| 42 41 625 | 6/1994 | Germany . |
| 3-50112 | 3/1991 | Japan . |

OTHER PUBLICATIONS

Catalog of Nippon Aerosil Co., Ltd., No. 19, pp. 38 and 39, "Technical Bulletin Aerosil" (1994).

*Primary Examiner*—Gabrielle Brouillette
*Assistant Examiner*—Moniqne Cole
*Attorney, Agent, or Firm*—Oblon, Spivak, McClelland, Maier & Neustadt, P.C.

[57] ABSTRACT

The present invention provides aqueous dispersion slurry of inorganic particles which is so stable as not to increase in viscosity, gel or sediment even if stored for a long time and therefore can be used as raw materials for, for example, cosmetics, paint, coating materials and lapping slurry for semiconductor wafers, and production method of such aqueous dispersion slurry. The aqueous dispersion slurry according to the present invention has the number of particles whose a particle diameter of 1.3 μm or more is 180,000 or less per mL in terms of 30 wt % in concentration, and the average particle diameter thereof is in a range of 0.05–0.9 μm. The number of particles having aparticle diameter of 1.3 μm or more is counted by using Particle Sensor KS-60, which is a light extinction type sensor for detecting particles, and Particle Counter KL-11, which is a particle counter, both of which made by the same manufacturer, Rion Electro Corp. The average particle diameter is measured by using Laser Particle Analyzer System Par-III made by Otsuka Denshi Co., Ltd.

2 Claims, 6 Drawing Sheets

AQUEOUS DISPERSION SLURRY OF INORGANIC PARTICLES AND PRODUCTION METHODS THEREOF

FIELD OF THE INVENTION

This invention generally relates to aqueous dispersion slurry of inorganic particles and production methods thereof. Aqueous dispersion slurry produced by production methods according to this invention is free from such problems as viscous increase, gelation and separation/sedimentation during storage, i.e., highly stable. For this reason, such aqueous dispersion slurry may be suitably used as raw materials for, for example, cosmetics, paint, coating materials and lapping slurry for semiconductor wafers.

BACKGROUND OF THE INVENTION

As raw materials for cosmetics, paint, coating materials and lapping slurry for semiconductor wafers, high-purity raw materials with a minimal concentration of impurities, such as inorganic particles synthesized by a vapor phase method, such as fumigation, (hereinafter referred to as "vapor phased inorganic particles") have been used. However, the vapor phased inorganic particles are so intensive in secondary coagulation that when the vapor phased inorganic particles are dispersed in the water, it is necessary to destroy and fuse coagula of such vapor phased inorganic particles in the water. If the coagula are not completely destroyed or fused and consequently there remain many coarse particles, problems, such as increase in viscosity of the aqueous dispersion slurry as the time passes, gelation and consequent loss of fluidity, and sedimentation/separation of the coagula. As a result, the aqueous dispersion slurry of inorganic particles can no longer be applied to those uses as described above.

As a method of dispersing the vapor phased inorganic particles in an aqueous medium, a method using a dispersion equipment of high-speed mixing type (e.g., whirling blender, and high shearing mixer) as disclosed in U.S. Pat. No. 5,116,535 (Japanese Unexamined Patent Publication No. 3-50112) has been known. Also, a method using equipment combining a powder introduction type mixer/disperser (e.g., jet stream mixer) with a toothed colloid mill, a dissolver or a skim mixer (Nippon Aerosil Co., Ltd.; Catalog No. 19: How to Handle Aerosil, p. 38) has also been known. However, both of these methods are disadvantageous in that a long-time processing is required and that vapor phased inorganic particles cannot be completely destroyed or fused and consequently there remain many coarse particles and the above problem is resulted in.

Under these circumstances, the development of a method of producing the aqueous dispersion slurry of various inorganic particles has been wanted.

SUMMARY OF THE INVENTION

It is a primary object of the present invention to provide aqueous dispersion slurry of inorganic particles which are highly stable with no viscous increase, no gelation or no sedimentation even if stored for a long time, whose number of particles having a particle diameter of 1.3 $\mu$m or more is 180,000 or less per mL in terms of a concentration of 30 wt %, and whose average particle diameter is in a range of 0.05–0.9 $\mu$m, and production methods of such aqueous dispersion slurry of inorganic particles.

The number of particles having a particle diameter of 1.3 $\mu$m or more, among all the inorganic particles dispersed in an aqueous medium, is counted by using Particle Sensor KS-60 which is a light extinction type sensor for detecting particles and Particle Counter KL-11 which is a particle counter, both of which made by Rion Electro Corp.

The average particle diameter of inorganic particles dispersed in an aqueous medium is measured by using Laser Particle Analyzer System Par-III which is a dynamic light scattering type measuring equipment made by Otsuka Denshi Co., Ltd.

Inorganic particles in the aqueous dispersion slurry according to the present invention consist of secondary particles only or secondary particles and primary particles.

When the average particle diameter of inorganic particles after dispersion in an aqueous medium is less than 0.05 $\mu$m, the viscosity of the aqueous dispersion slurry is too high to be easily handled. When such diameter is more than 0.9 $\mu$m, the stability is spoiled and sedimentation occurs. This particle diameter can be controlled by changing the type of the raw material for inorganic particles or by adjusting the solid concentration in the kneading process.

The aqueous dispersion slurry according to the present invention can be used as a raw material for, for example, cosmetics, paint, coating materials and lapping slurry for semiconductor wafers.

The aqueous dispersion slurry according to the present invention can be produced by, for example, the methods (A) and/or (B) as described below.

Method (A): According to this production method, inorganic particles are added to and dispersed in an aqueous medium within a kneading tank of a kneader of such operation mode that mixing blades rotate around respective subsidiary spindles and the subsidiary spindles revolve around a spindle. Here, such type that mixing blades rotate around respective subsidiary spindles and the subsidiary spindles revolve around a spindle is generally called "a planetary motion type."

Method (B): According to this production method, inorganic particles are dispersed in an aqueous medium, and then filtrated through a depth type filter. It is preferable that the above production method (A) should be used for dispersing inorganic particles, but methods other than the above (A) may also be used. Here, the depth type filter refers to a filter made of a filter material with such a pore structure that is coarse on the inlet side and fine on the outlet side and becomes finer from the inlet side toward the outlet side with or without steps. That is, as the filter material is so thick (e.g., 0.2–2 cm) that a large quantity of foreign matters can be removed from the fluid passing through such filter material. As a variety of the depth type filter, there are a cartridge type filter (made by Advantec Toyo Co., Ltd. and Nippon Paul Co., Ltd.) and a filter bag type filter (made by ISP Co., Ltd.).

BRIEF DESCRIPTION OF THE DRAWINGS

FIG. 2 is a schematic showing a principle of a planetary kneader, wherein FIG. 2 (a) is a top view thereof, and FIG. 2 (b) is a side view thereof;

FIG. 3 (a) is a perspective view schematically showing a cylindrical depth type filter cartridge, and FIG. 3 (b) is a schematic descriptively showing a pore structure in the direction of thickness and fiber diameter of the depth type filter;

FIG. 4 (a) is a construction view showing an example of a filtration system using the depth type filter of FIG. 3(a), and FIG. 4 (b) is a perspective view schematically showing a depth type filter of a filter bag type;

DETAILED DESCRIPTION OF THE INVENTION

Now, the present invention will be described in detail.

(1) COUNTING OF THE NUMBER OF PARTICLES

The number of particles having a diameter of 1.3 μm or more is counted by using Particle Sensor KS-60 and Particle Counter KL-11.

Figure 1:
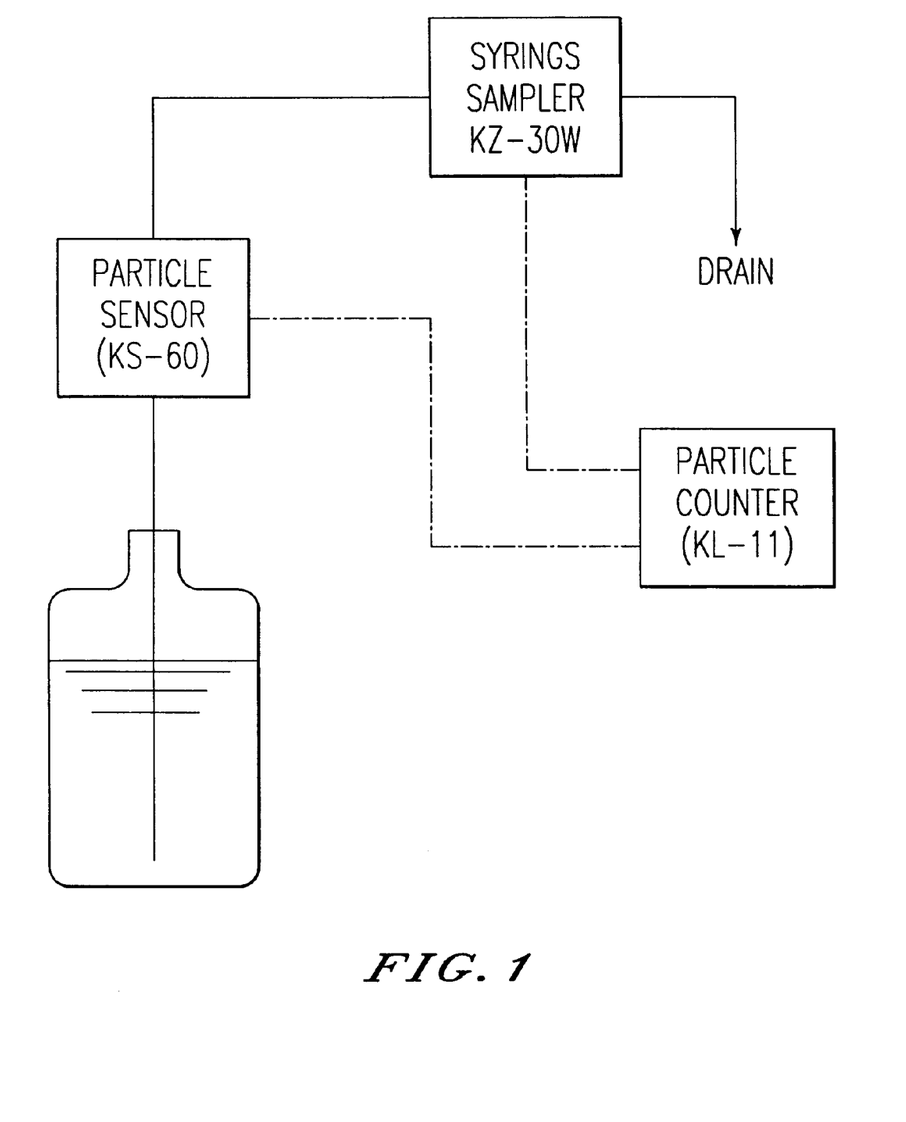
FIG. 1 is a descriptive view showing a principle of counting of the number of inorganic particles having a diameter of 1.3 $\mu$m or more and dispersed in an aqueous medium.

FIG. 1 shows the construction of a counting system which counts the number of particles having a specified particle diameter (here, 1.3 μm) or more per a specified volume (e.g., 1 mL) of a sample fluid (diluted aqueous dispersion slurry) by using Particle Counter KL-11 (particle counter made by Rion Electro Corp.) while the sample fluid is sucked by using Syringe Sampler KZ-30W (made by Rion Electro Corp.) so that the flow rate of the sample fluid passing through a detection position of Particle Sensor KS-60 (light extinction type sensor for particle detection, made by Rion Electro Corp.) can be adjusted to a specified flow rate (e.g., 10 mL/min). Counting is made when the above flow rate becomes stable.

In the counting system constructed as shown in FIG. 1, a light beam is irradiated to cross the transparent flow cell (detection position for flow passage of the sample fluid) part of Particle Sensor KS-60. The light reached the light receiving side is detected at the light receiving unit of Particle Sensor KS-60. The detected signal is sent to Particle Counter KL-11. At Particle Counter KL-11, the number of particles having a diameter of 1.3 μm or more passing through the irradiated area are obtained based on changes in the pulses due to the decrease in the intensity of permeated light caused by the particles passing through the irradiated area. This method is called "light extinction method." Here, an LED lamp is used as a light source of Particle Sensor KS-60, and a photodiode is used as a light receiving unit thereof.

The counting system shown in FIG. 1 (which is composed of Particle Sensor KS-60, Syringe Sampler KZ-30W, and particle Counter KL-11) is originally designed for use in counting the number of fine particles in liquid containing a very small quantity of fine particles (i.e., liquid with very high purity). However, according to the present invention, this counting system is used for counting the number of fine particles in aqueous dispersion slurry containing a very large quantity of fine particles. For this reason, according to the present invention, sample aqueous dispersion slurry is diluted with, for example, 100 times as much as ion exchange water and the number of fine particles in the diluted liquid is counted, the count of the number of fine particles in the above ion exchange water is subtracted from the count of the number of fine particles in the diluted liquid, the obtained count is converted to the concentration before dilution, and thereby the number of fine particles in the aqueous dispersion slurry is obtained.

Particle Sensor KS-60 is applicable to a particle diameter range of 1–40 μm, and a counting loss of 5% or less when the flow rate of the sample fluid is approx. 10 mL/min and the quantity concentration is 0–2,000 pcs/mL. By combining this Particle Sensor KS-60 with Syringe Sampler KZ-30W and Particle Counter KL-11, it is possible to count the number of particles in 0.1 mL.

(2) INORGANIC PARTICLES

Inorganic particles used for the present invention are produced by, for example, a vapor phase method, a wet method or a sol gel method. As the vapor phase method, a fumed method (high-humidity flame hydrolysis method), and a Nanofuse Technology Company method (metal evaporation and oxidation method) may be named. Furthermore, a production method in which natural inorganic compounds are pulverized, refined and/or classified can be named. Preferably, the inorganic particles should be produced by the vapor phase method, and more preferably, by the fumed method. The inorganic particles produced by the vapor phase method are highly purified and therefore favorable. The inorganic particles produced by the fumed method are highly purified and also comparatively economical and therefore particularly favorable.

As the inorganic particles used for the present invention, metallic oxides may be exemplified, such as silicon oxide, aluminum oxide, titanium oxide, zirconium oxide, antimony oxide, chromium oxide, germanium oxide, vanadium oxide, tungusten oxide, iron oxide, manganese oxide and cerium oxide. Particularly favorable among these metallic oxides are silicon oxide, aluminum oxide, titanium oxide and cerium oxide.

Typically, the inorganic particles to be dispersed are in a form of powder existing as coagula (called "secondary particles") of small particles (called "primary particles"). The average diameter of these primary particles is normally in a range of 0.005–1 μm.

(3) DISPERSION PROCESS (3-1) KNEADER OF PLANETARY MOTION TYPE

Figure 2A:
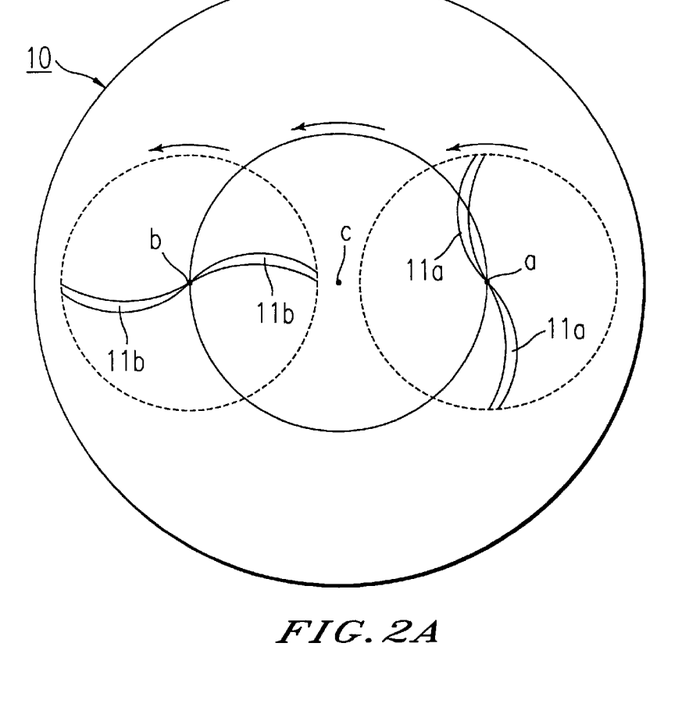
Figure 2B:
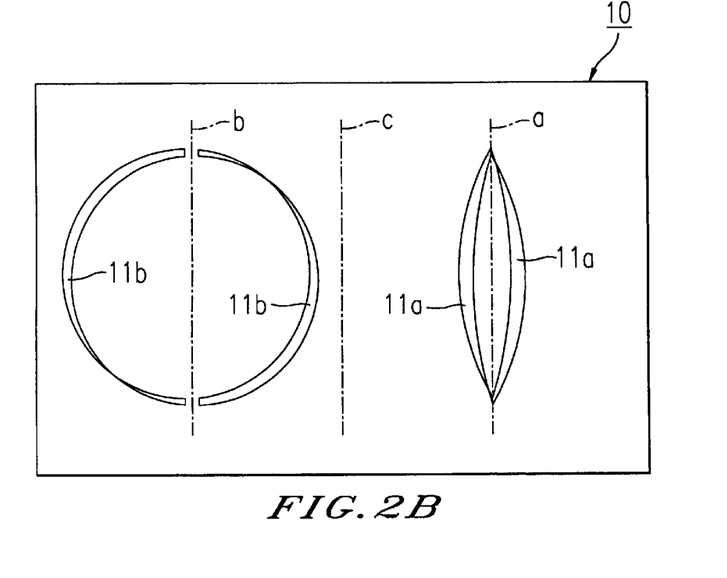

The above method (A) uses a kneader of planetary motion type. FIG. 2 schematically shows a planetary kneader, wherein FIG. 2 (a) is a top view of such planetary kneader, and FIG. 2 (b) is a side view thereof. A kneader tank 10 of the kneader shown in this figure is equipped with mixing blades 11a which rotate around a subsidiary spindle a in a direction indicated by an arrow, mixing blades 11b which rotate around a subsidiary spindle b in a direction indicated by an arrow, and a spindle c which revolves to drive these 2 subsidiary spindles a and b in a direction indicated by an arrow. That is, it is so constructed that the mixing blades 11a and 11b "rotate" around the respective subsidiary spindles a and b, while the subsidiary spindles a and b "revolve", around the spindle c.

As the mixing blades 11a and 11b provided as described above move with complicated loci, the fluid within the kneading tank 10 can be uniformly kneaded and the coagula can be completely severed. As a result, a large quantity of powder can be efficiently dispersed in a comparatively small quantity of liquid.

In FIG. 2, 2 pieces of subsidiary spindles a and b are shown. However, it is acceptable that single piece of subsidiary spindle is provided or 3 pieces or more of subsidiary spindles are provided instead of 2 pieces of subsidiary spindles. Furthermore, when a plurality of subsidiary spindles are provided, each piece of subsidiary spindle may be positioned at regular intervals or may be provided at irregular intervals.

Also in FIG. 2, the 2 pieces of mixing blades 11a and 11b are provided as a pair on the respective subsidiary spindles a and b. However, it is acceptable that single piece of mixing blade is provided on the respective subsidiary spindles, or 3 pieces or more mixing blades are provided as a pair on the respective subsidiary spindles.

It is also acceptable that a high-speed blade is provided on a spindle coaxially with or on a spindle different from the respective subsidiary spindles of the mixing blades to improve the ability of severing and dispersing the coagula by means of such high-speed blade.

In FIG. 2, both the spindle c and the subsidiary spindles a and b rotate counterclockwise viewed from the top. However, it is acceptable that the spindle c and the subsidiary spindles a and b are set differently from each other in the rotational direction to have different loci of the motion of the mixing blades.

In FIG. 2, the mixing blades 11a and 11b are curved and twisted between the ends (i.e., in a twisted shape). However, it is accepted that the mixing blades 11a and 11b are differently shaped in any way as long as such shape ensures that the fluid within the kneading tank can be uniformly kneaded and the coagula can be completely severed and as a result a large quantity of powder can be efficiently dispersed in a comparatively small quantity of liquid.

Among those planetary kneaders which satisfy the requirements described above are Universal Mixer/Stirrer (made by Dalton Co., Ltd.), Universal Mixer (made by Powlex Co., Ltd.), KPM Power Mix (made by Kurimoto Tekkojo Co., Ltd.), Planetary Kneader/Mixer (made by Ashizawa Co., Ltd.), T. K. Hibis Disper Mix (Tokushu Kika Kogyo Co., Ltd.), and Planetary Disper (Asada Iron Works Co., Ltd.), which can be preferably used. Particularly, Planetary Disper and T. K. Hibis Disper Mix, both of which combine mixing blades and a high-speed blade (disper), are preferable for their ability to uniformly disperse a large quantity of powder in a comparatively small quantity of liquid in a short time.

(3-2) KNEADER OF NON-PLANETARY MOTION TYPES

In the dispersion process of the above method (B), instead of or together with the above kneader of planetary motion type, the following dispersion equipment may be used. When the following equipment is used together with the kneader of planetary motion type or a plurality of the following equipment are used, any of which may be used first.

For example, (a) a powder introducer/mixer/disperser which can disperse inorganic particles directly in an aqueous medium while sucking them (Jet Stream Mixer made by Mitamura Riken Kogyo Inc.), (b) a high-pressure homogenizer which has fluid bumped and dispersed (Manton Gaurin Homogenizer made by Doei Shoji Co., Ltd., Bertli Homogenizer made by Japan Machinery Company, Microfluidizer made by Mizuho Industrial Co., Ltd., Nanomizer made by Tsukishima Kikai Co., Ltd., Genus PY made by Genus Co., Ltd., System Organizer made by Nippon BEE Co., Ltd., and Ultemizer made by Ito Industrial Machine Co., Ltd.), etc. may be used. Furthermore, dispersers, such as a bead mill, may be used. Among preferable materials of beads are non-alkali glass, alumina, zircon, zirconia, titania and silicon nitride.

Preferably, these equi$\mu$ment and the above kneader of planetary motion type should be provided with a lining of resin, such as polyurethane, Teflon or epoxy resin, or a lining of ceramic on the inner wall, mixing blades and other parts in contact with liquid to improve the wear resistance in order to protect the aqueous dispersion slurry of inorganic particles from metallic contamination.

(3-3) CONCENTRATION IN THE DISPERSION PROCESS

In the dispersion process of the aforesaid method (A), the concentration of the inorganic particles in powder in dispersion in an aqueous medium should be 30–70 wt %, preferably be 35–60 wt %, and more preferably be 40–50 wt %. If the solid concentration of the inorganic particles is less than 30 wt %, the dispersion efficiency drops to such an extent that a large quantity of coagula may be left in the obtained aqueous dispersion slurry, and as a result, such coagula may sediment and separate during storage or gel due to viscous increase. On the other hand, if the solid concentration of the inorganic particles exceeds 70 wt %, load on the disperser becomes too large to maintain mixing in motion. If mixing is forced in such state, the inorganic particles are excessively dispersed, and as a result, a large quantity of coarse particles having a particle diameter of 10 $\mu$m or more may be produced due to re-coagulation.

(3-4) METHOD OF ADDING INORGANIC PARTICLES

In the dispersion process of the aforesaid method (A), it is preferable that the inorganic particles should be dispersed in an aqueous medium while they are being continuously or intermittently added. If the inorganic particles are added in the whole quantity of the required at a time at the start, not only it is difficult to uniformly disperse the inorganic particles but also the mixer may be stopped by the excessively large load. As an ideal method of adding the inorganic particles, it is preferable that the inorganic particles should be quickly added until the solid concentration reaches around 20 wt % and then continuously or intermittently added while monitoring the electric current value of (load on) the kneader not to be too large. As a hopper for supplying the inorganic particles in powder, a screw transfer type or the like may be named.

(3-5) ADDITION OF ALKALI OR ACID

Adding an acid or alkali to the above aqueous medium is preferable as the stability of the finally obtained aqueous dispersion slurry of inorganic particles is improved. When an acid is added, it is preferable that the pH of the aqueous dispersion slurry of inorganic particles obtained after the final dilution should be in a range of 7–2. When an alkali is added, it is preferable that the pH of the aqueous dispersion slurry of inorganic particles obtained after the final dilution should preferably be in a range of 7–12. If the pH is smaller than 2 or larger than 12, the inorganic particles may be dissolved or coagulated.

An acid or an alkali may be added to the aqueous dispersion slurry in any timing. It may be added to the aqueous medium beforehand, during the addition of inorganic particles in powder, after the addition of inorganic particles in powder, during kneading or after kneading. Preferably, it should be added during kneading or before dilution after kneading (The dilution will be described later.). When it is added during kneading or before dilution after kneading, the coagulation of the aqueous dispersion slurry due to the addition of an acid or alkali can be prevented.

As an acid, inorganic acids, such as hydrochloric acid, nitric acid, sulfuric acid and phosphoric acid, or organic acids, such as acetic acid, phthalic acid, acrylic acid, methacrylic acid, crotonic acid, polyacrylic acid, maleic acid and sorbic acid, may be used. Among of these, hydrochloric acid, nitric acid and acetic acid, which are univalent acids, are preferable.

As an alkali, inorganic bases, such as potassium hydroxide, sodium hydroxide, lithium hydroxide and ammonia, and amines, such as ethylenediamine, trirthylamine and piperazine, may be used.

(3-6) DILUTION, ETC.

It is preferable that the aqueous dispersion slurry obtained in the above dispersion process should be diluted. The extent of dilution depends on the type of the dispersed inorganic particles or the solid concentration during kneading.

However, it is preferable that the aqueous dispersion slurry should be diluted with an aqueous medium to lower the solid concentration by around 5 wt % or more from the solid concentration during kneading. If the solid concentration during the kneading process is maintained, not only the aqueous dispersion slurry is too viscous to be easily handled but also the aqueous dispersion slurry becomes more viscous or gels during storage. As a dilution method, directly supplying an aqueous medium to the kneader is preferable as the aqueous dispersion slurry can be taken out of the kneader more easily. The aqueous dispersion slurry may be subjected after dispersion to further dispersion processing in another kneader or disperser to increase the uniformity. In this case, for example, a corres-type high-speed mixer/disperser, a homo-mixer, a high-pressure homogenizer or a bead mill may preferably be used.

(4) FILTRATION

In order to completely remove coarse inorganic particles existing in the aqueous disperse slurry according to the present invention, it is preferable that the aqueous disperse slurry should be subjected after dispersion to further filtration processing using a depth type filter. As a depth type filter, a filter bag type filter (made by ISP Co., Ltd.), as well as a cartridge type filter (made by Advantec Toyo Co., Ltd., Nippon Paul Co., Ltd., etc.), may be used.

The depth type filter refers to a filter made of a filter material with such a pore structure that is coarse on the inlet side and fine on the outlet side and becomes finer from the inlet side toward the outlet side with or without steps. That is, as the filter material is so thick (e.g., 0.2–2 cm) that a large quantity of foreign matters can be removed from the fluid passing through this filter material.

Figure 3A:
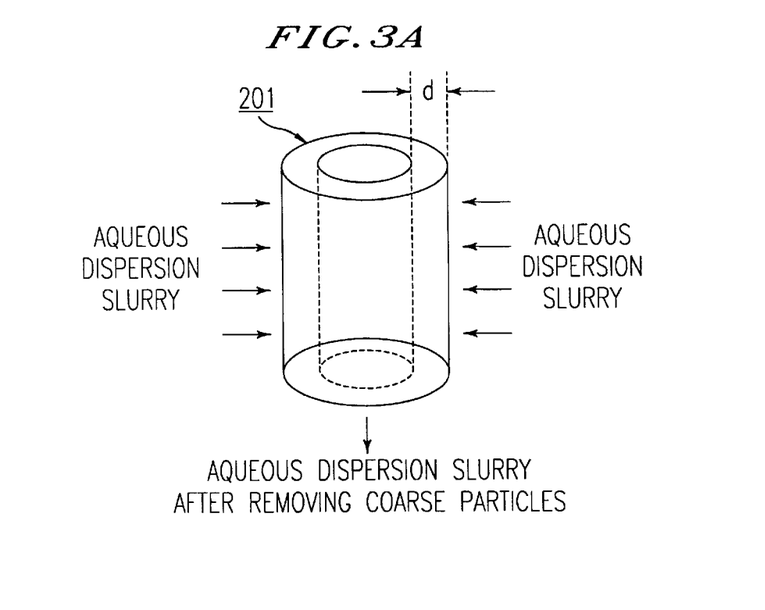
Figure 3B:
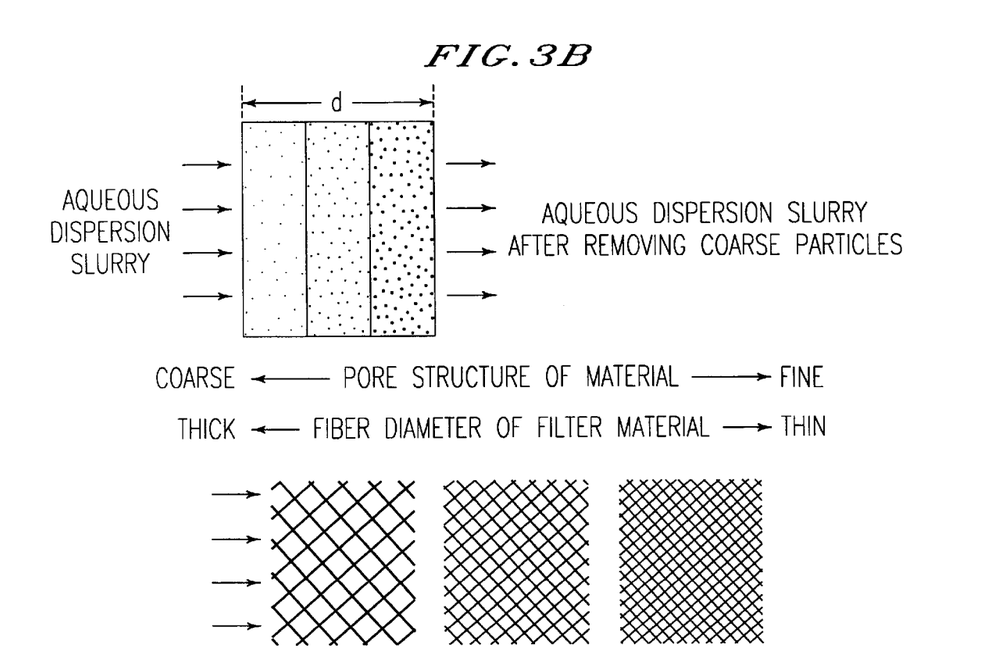

For example, as shown in FIG. 3 (b), the depth type filter is a filter material having a thickness of d and so designed that the pore structure is coarse on the entry (inlet) side for the fluid and fine on the discharge (outlet) side thereof and becomes finer from the entry side toward the discharge side with or without steps (for becoming finer with steps, the number of steps may be 1 or more). Owing to this pore structure, among all the coarse particles, comparatively large particles are removed near the entry side, and comparatively small particles are removed near the discharge side. As a whole, coarse particles are removed throughout the filter in the direction of thickness. As a result, coarse particles can be exactly removed, and at the same time, the filter is not clogged with particles so easily and therefore can extend its service life.

Also, as shown in FIG. 3 (b), the depth type filter uses a filter material which is so designed that the fiber is thick on the entry (inlet) side of the fluid and thin on the discharge (outlet) side. Owing to this fiber arrangement, the void is almost uniform from the entry side of the fluid to the discharge side thereof. Here, the void is a percentage of gap per unit cross-sectional area within a plane which crosses at right angles the passing direction of the fluid. As the void is almost uniform as described above, pressure loss caused when the fluid is passing through the filter is small, and the removing conditions of coarse particles are almost uniform in the direction of thickness. Furthermore, a pump of comparatively low pressure specifications can be used.

Figure 4A:
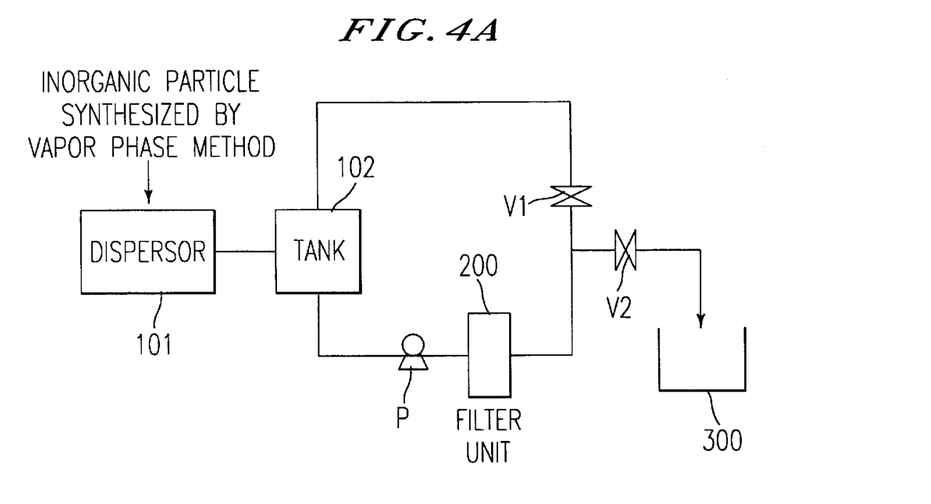
Figure 4B:
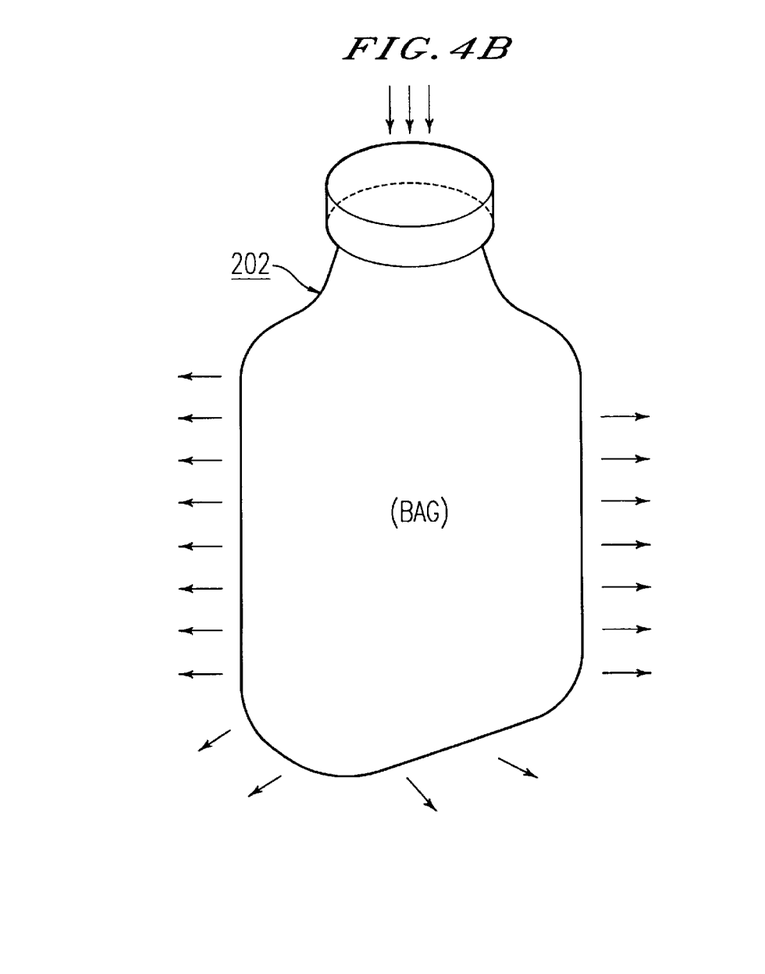

The depth type filter may be a cylindrical filter 201 of cartridge type as shown in FIG. 3 (a) or a filter 202 of bag type as shown in FIG. 4 (b). The cylindrical filter 201 is advantageous in that the thickness of the filter material can be designed to the desired thickness. On the other hand, the bag type filter 202 has an effect that as it can be provided within a filter unit 200 (FIG. 4 (a)) so that the fluid can pass through from the inside of the bag to the outside thereof, the removed particles can be disposed of together with the bag type filter 202 when the latter is replaced.

When such depth type filter is set within the filter unit 200 shown in FIG. 4 (a), it is possible to remove coarse particles from the aqueous dispersion slurry in which inorganic particles were added to and dispersed in an aqueous medium.

Incidentally, by selecting the pore structure of the filter, the particle diameter of the coarse particles to be removed can be controlled accordingly.

FIG. 4 (a) shows a system in which inorganic particles are added to and dispersed in an aqueous medium within a disperser 101, then this aqueous dispersion slurry is stored within a tank 102, then the aqueous dispersion slurry is forcedly fed out of the tank 102 by a pump P to the filter unit 200, then filtrated through the filter 201 (or 202) set within the filter unit 200, and then returned into the tank 102 through a valve V1, and this circulation is repeated until coarse particles are completely removed from the dispersion slurry, and then the aqueous dispersion slurry after the removal of coarse particles is stored within a tank 300 by closing the valve V1 and opening a valve V2 at the same time. Although the system shown in FIG. 4 (a) is circulation type, a system of non-circulation type may be used. Furthermore, when the non-circulation type system is used, the filtration processing may be performed by pneumatically pressurizing the tank instead of the pressure pump P.

Moreover, a centrifugal separation method may also be used in combination. In addition, when a filter of large pore structure is used in combination in the upstream, the depth type filter can be protected better from clogging, and extend its service life.

EXAMPLES

Firstly, counting and measuring methods (number of particles having a particle diameter of 1.3 µm or more and the average particle diameter) and evaluation methods suitable for the aqueous dispersion slurry of Examples 1 to 10 and the aqueous dispersion slurry of Reference Examples 1 to 6 will be described.

(1) COUNTING OF THE NUMBER OF PARTICLES

The number of particles having a particle diameter of 1.3 µm or more was counted as described below by using a counting system as shown in FIG. 1 (composed of Particle Counter KL-11, Particle Sensor KS-60 and Syringe Sampler KZ-30W, which are all made by Rion Electro Corp.).

The number of particles having a particle diameter of 1.3 µm or more within ion exchange water for dilution per mL was counted, and denominated the count as "Count A." Specifically, ion exchange water for dilution was poured for about 100 mL into a polyethylene container, and subjected to ultrasonic processing for 5 minutes, and then the number of particles having a particle diameter of 1.3 µm or more per mL was counted. This cycle was repeated 4 times, and the average count of 3 cycles except for the first cycle was denominated as "Count A." Here, when the count exceeded 50, the filter in the ion exchange water maker was replaced, and the confirmation was made that the count was less than 50, and then the number of the particles was counted to obtain the Count A.

Then, the sample aqueous dispersion slurry was diluted with the above ion exchange water, and the number of particles having a particle diameter of 1.3 µm or more per mL was counted, and the count obtained was denominated as "Count B." Specifically, the ion exchange water for dilution was poured for 99 mL into a polyethylene container, which was not the same as the above polyethylene container, and subjected to ultrasonic processing for 5 minutes. Then, the sample aqueous dispersion slurry whose concentration was adjusted to 30 wt % was added for 1.0 mL to the ion exchange water by using a micropipette. The ion exchange water added with the aqueous dispersion slurry was carefully stirred by using a resin bar, and then the number of particles having a particle diameter of 1.3 μm or more per mL was counted. The count obtained was denominated as "Count B."

From the Count A and Count B obtained as above, the net count (the number of particles having a particle diameter of 1.3 μm or more within the diluted liquid per mL) N was obtained by using an equation of "N=B−A." To obtain the number of particles having a particle diameter of 1.3 μm or more per mL in terms of 30 wt % in concentration, the above count N should be increased 100 times.

(2) MEASUREMENT OF AVERAGE PARTICLE DIAMETER

The average particle diameter was measured by the dynamic light scattering method using Laser Particle Analyzer System Par-III (made by Otsuka Denshi Co., Ltd.).

(3) EVALUATION METHOD

The stable shelf life was evaluated based on the presence of sediment when stored at 25° C.

To check for surface defects (scratches), a lapping machine LM-15 (made by Lap Master SFT Co., Ltd.) with a surface plate having a diameter of 380 mm was used. The surface plate of the lapping machine was stuck with a pad IC1000 (made by Rodel Nitta Co., Ltd.). The pad was provided with a silicon wafer, and lapped for 30 minutes with the aqueous dispersion slurry diluted to a concentration of 10%. After the lapping, the silicon wafer was washed and dried, and then the surface thereof was visually observed through a differential interference microscope for surface defects (scratches). As lapping conditions, the processing pressure was set to 100 g/cm$^2$, the rotational speed of the surface plate was set to 30 rpm, and the abrasive feed rate was set to 100 cc/min.

The results of this evaluation were tabulated later.

Example 1

Aerosil #50 (fumed silica (silicone dioxide) made by Nippon Aerosil Co., Ltd.) was continuously added for 6 kg for 30 minutes to 6 kg of ion exchange water while the mixture was kneaded by a kneader of planetary motion type (T. K. Hibis Disper Mix Model HDM-3D-20 made by Tokushu Kika Kogyo Co., Ltd.) with the twisted blades rotating around the respective subsidiary spindles at 30 rpm and the subsidiary spindles revolving around the spindle at 10 rpm. After the addition, at a solid concentration of 50 wt %, the mixture was subjected to the kneading with the respective subsidiary spindles for the twisted blades revolving at 30 rpm for 1 hour and at the same time to the dispersion processing with the subsidiary spindles for the corres type high-speed rotary blades having a diameter of 80 mm revolving at 2000 rpm while the spindle rotating at 10 rpm for 1 hour.

Then, potassium hydroxide solution having a concentration of 20 wt % was added for 0.3108 kg to the mixture. The mixture was subjected to kneading with the respective subsidiary spindles for the twisted blades revolving at 30 rpm for 10 minutes and at the same time to the dispersion processing with the subsidiary spindles for the corres type high-speed rotary blades having a diameter of 80 mm revolving at 2000 rpm while the spindle rotating at 10 rpm for 10 minutes.

The aqueous dispersion slurry obtained as above was diluted with ion exchange water and the aqueous dispersion slurry of silicon dioxide having a concentration of 30 wt % was obtained. By passing this aqueous dispersion slurry through a depth type cartridge filter having a pore size of 5 μm, coarse particles were removed.

The average particle diameter of the aqueous dispersion slurry of silicon dioxide obtained as above was 0.20 μm, and pH thereof was 10.6.

Figure 5:
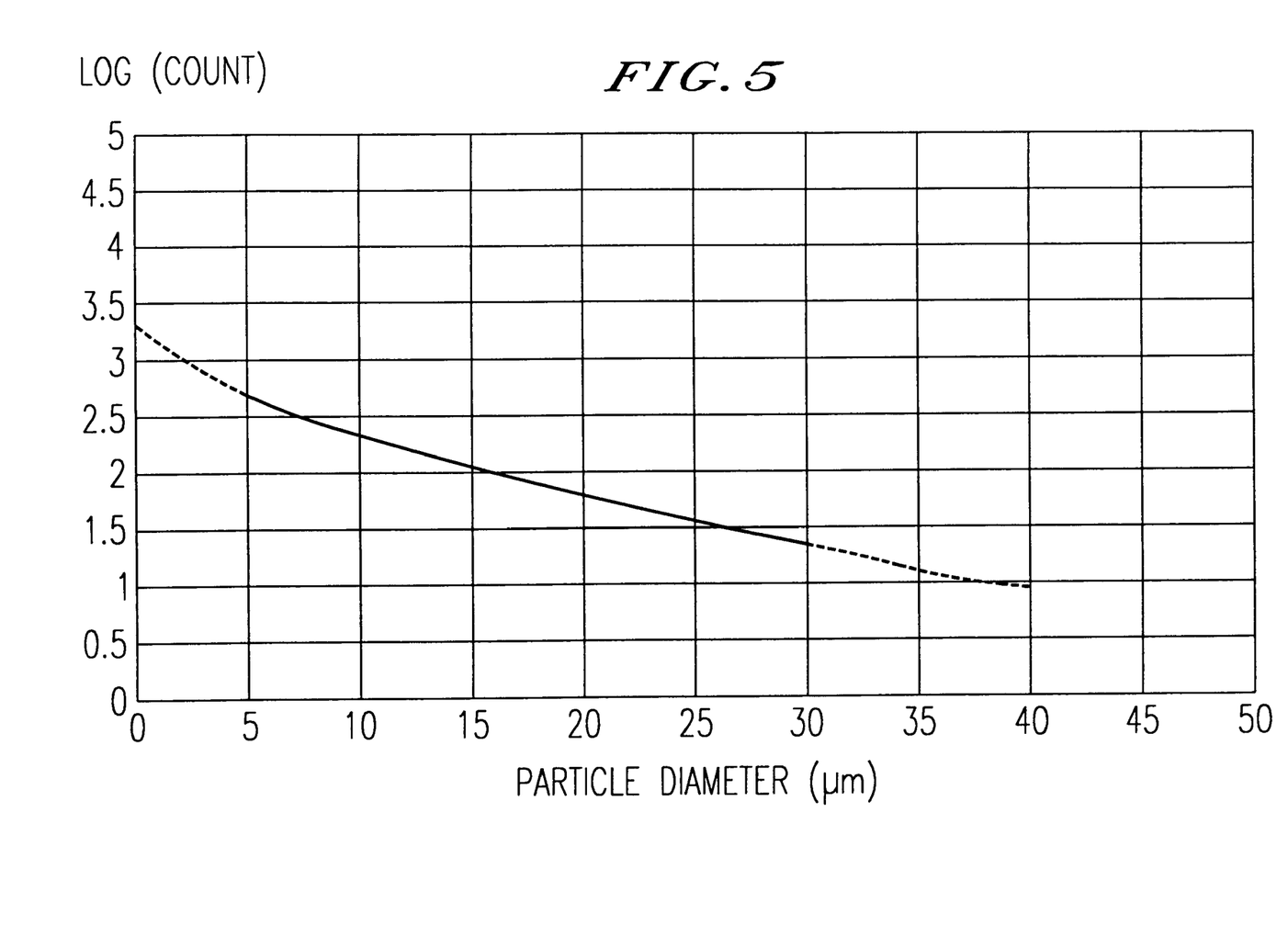
FIG. 5 is a characteristic chart showing the distribution of particle diameters of Example 1.

Then, the net number of particles having a particle diameter of 1.3 μm or more per mL was obtained as described above as 160,000 in terms of a concentration of 30 wt %, and the distribution of the particle diameters thereof was as shown in FIG. 5. No scratches were recognized. The stable shelf life was 2 months or more.

Example 2

Except that the solid concentration in the kneading process was set to 40 wt %, the aqueous dispersion slurry was obtained in the same way as Example 1. The average particle diameter of the aqueous dispersion slurry of silicon dioxide obtained as above was 0.25 μm, and pH thereof was 10.5.

Figure 6:
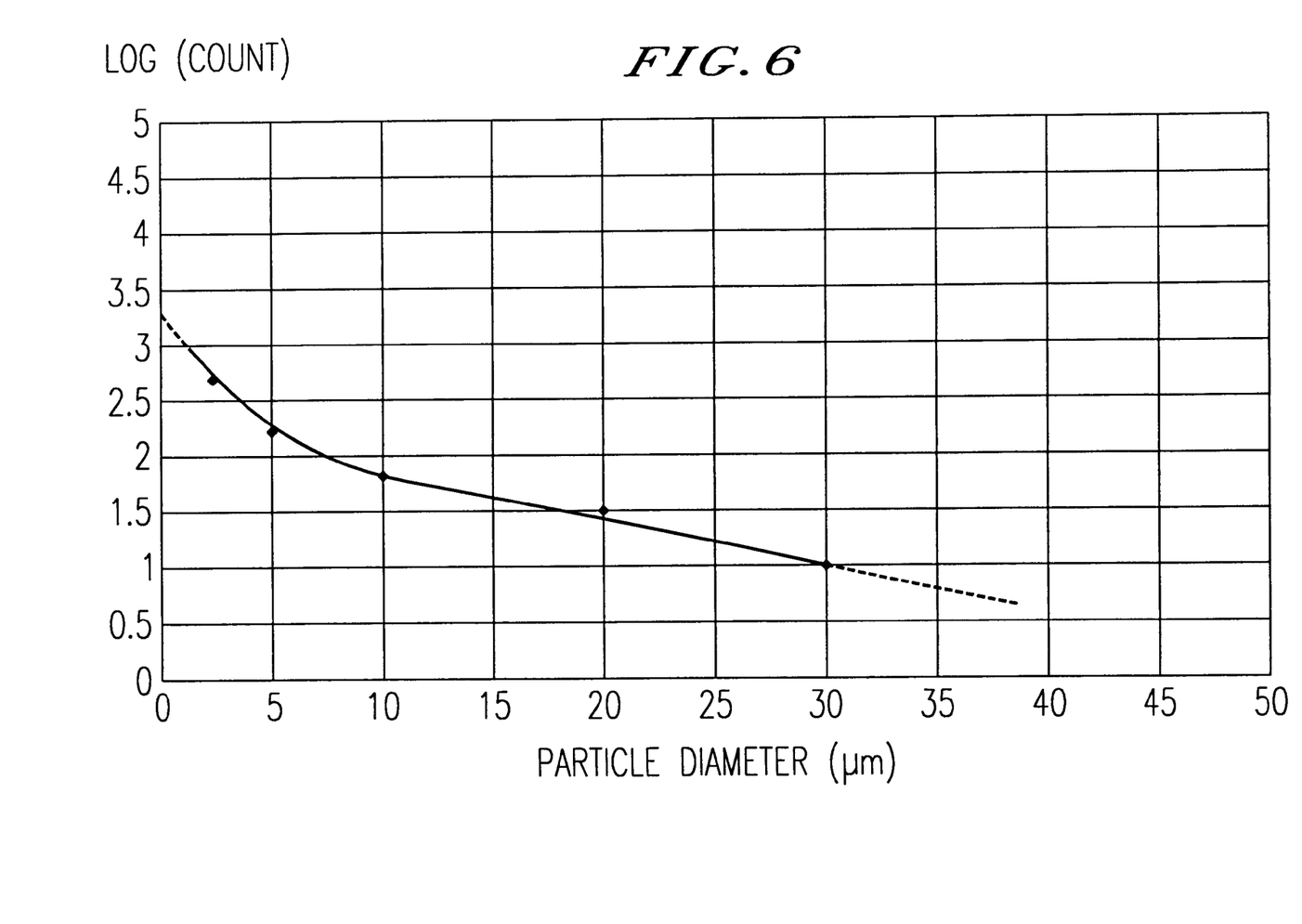
FIG. 6 is a characteristic chart showing the distribution of particle diameters of Example 2.

Then, the net number of particles having a particle diameter of 1.3 μm or more per mL was obtained as described above was 65,000 in terms of a concentration of 30 wt %, and the distribution of the particle diameters was as shown in FIG. 6. No scratches were recognized. The stable shelf life was 2 months or more. From FIGS. 5 and 6 showing the distribution of particle diameters of Example 1 and Example 2, respectively, it is presumable that when the range of particle diameter measurement by using measuring equipment was set to be less than 1.3 μm, the measurement results indicated by the broken line extended to the left can be obtained. According to this application, the number of particles having a particle diameter of 1.3 μm or more was counted considering the precision of the measuring equipment. However, if such measuring equipment are used that can achieve a sufficiently high precision even for a particle diameter of less than 1.3 μm, it may be so arranged that the number of particles having a particle diameter less than 1.3 μm for which a sufficiently high precision can be achieved is counted. In this case, it is presumable that the measurement results as indicated by the broken line extended to the left in FIGS. 5 and 6 can be obtained. Then, depending on the results of such measurement, the number of particles having smaller particle diameters than 1.3 μm may be indicated. For example, it may be arranged that the number of particles having aparticle diameter of 1.3 μm or more is indicated.

Example 3

Except that the solid concentration in the kneading process was set to 45 wt % and that the aqueous dispersion slurry after dispersion by kneading was subjected to further dispersion processing by using a high-pressure homogenizer (Genus PY Model PRO2-15 made of Genus Co., Ltd.) equipped with a single-crystal diamond unit and further subject to the processing with a depth cartridge filter having a pore size of 5 μm, the aqueous dispersion slurry was obtained in the same way as Example 1. The average particle diameter of the aqueous dispersion slurry of silicon dioxide obtained as above was 0.23 μm and the pH thereof was 10.6.

Then, the net number of particles having a particle diameter of 1.3 μm or more per mL was obtained as described above as 43,000 in terms of a concentration of 30 wt %. No scratches were recognized. The stable shelf life was 2 months or more.

Example 4

Except that potassium hydroxide solution having a concentration of 20% was poured into ion exchange water before dispersion by using the Aerosil, the aqueous dispersion slurry was obtained in the same way as Example 3. The average particle diameter of the aqueous dispersion slurry of silicon dioxide obtained as above was 0.23 $\mu$m, and the pH thereof was 10.6.

Then, the net number of particles having a particle diameter of 1.3 $\mu$m or more per mL was obtained as described above as 82,000 in terms of a concentration of 30 wt %. No scratches were recognized. The stable shelf life was 2 months or more.

Example 5

Except that 9 kg of Aerosil #50 (fumed silica (silicone dioxide) was continuously added for 60 minutes to 9 kg of ion exchange water while the mixture was kneaded by a kneader of planetary motion type (T. K. Hibis Disper Mix Model HDM-3D-20 made by Tokushu Kika Kogyo Co., Ltd.) with the twisted blades rotating around the respective subsidiary spindles at 30 rpm and the subsidiary spindle revolving around the spindle at 10 rpm, the aqueous dispersion slurry was obtained in the same way as Example 1. The average particle diameter of the aqueous dispersion slurry of silicon dioxide obtained was 0.22 $\mu$m, and the pH thereof was 10.6.

Then, the net number of particles having a particle diameter of 1.3 $\mu$m or more per mL was obtained as described above as 64,000 in terms of a concentration of 30 wt %. No scratches were recognized. The stable shelf life was 2 months or more.

Example 6

6 kg of Metal evaporated and oxidized alumina (Nanotek made by Nanofuse Technology Co., Ltd. represented by CI Chemical Co., Ltd.) was continuously added for 30 minutes to the the 0.72 kg of 1 N nitric acid solution diluted with 5.28 kg of ion exchange water by a kneader of planetary motion type (TK Hibis Disper Mix Model HDM-3D-20 made by Tokushu Kika Kogyo Co., Ltd.) with the twisted blades rotating around the respective subsidiary spindles at 30 rpm and the subsidiary spindle revolving around the spindle at 10 rpm, thereby, the aqueous dispersion slurry was obtained. After such addition, 3 kg of ion exchange water was added to adjust the solid concentration to 40 wt %. Then, the mixture was subjected to kneading with the respective subsidiary spindles for the twisted blades revolving at 30 rpm and at the same time to the dispersion processing with the subsidiary spindles for the corres type high-speed rotary blades having a diameter of 80 mm revolving at 2000 rpm while the spindle rotating at 10 rpm for 60 minutes.

The aqueous dispersion slurry obtained as above was diluted with ion exchange water and the aqueous dispersion slurry of metal evaporated and oxidized alumina having a concentration of 20 wt % was obtained. By passing this aqueous dispersion slurry through a depth type cartridge filter having a pore size of 3 $\mu$m, coarse particles were removed.

The average particle diameter of the aqueous dispersion slurry of silicon dioxide obtained as above was 0.13 $\mu$m, and the pH thereof was 4.2.

Then, the net number of particles having a particle diameter of 1.3 $\mu$m or more per mL was obtained as described above as 15,000 in terms of a concentration of 30 wt %. No scratches were recognized. The stable shelf life was 2 months or more.

Example 7

Fumed silica (Aerosil #50 made by Nippon Aerosil Co., Ltd.) was preliminarily dispersed for 15 kg in 60 kg of ion exchange water while being sucked by a powder introducer/mixer/disperser (Jet Stream Mixer TDS made by Mitamura Riken Kogyo Inc.). Then, thus obtained preliminarily dispersed slurry were subjected to the dispersion (main dispersion) processing by using a highpressure homogenizer provided with a sintered diamond dispersion unit (Micro Fluidizer model M210B made by Mizuho Industrial Co., Ltd.) under a pressure of 800 kg/cm$^2$. Then, thus obtained dispersion slurry (main dispersion slurry) were added with potassium hydroxide solution having a concentration of 20% while being stirred, so that the pH thereof was adjusted to 10.

Then, the above aqueous dispersion slurry of silica was put into a pressure container having a capacity of 100 L, and passed once through a polypropylene depth cartridge filter having a cartridge length of 25 cm, a filter fiber thickness (through which the fluid passes) of 2 cm and a 5 $\mu$m particle removal ability of 100% (Profile MCY100Y050 made by Nippon Poll Co., Ltd.) under a nitrogen pressure of 0.8 kg/cm$^2$.

The average particle diameter of the aqueous dispersion slurry of fumed silica obtained as above was 0.25 $\mu$m, and the net number of particles thereof having a particle diameter of 1.3 $\mu$m or more per mL was obtained as described above as 95,000 in terms of a concentration of 30 wt %. This aqueous dispersion slurry was left at 25° C. for 30 days, but no viscous increase, no gelation or no sedimentation was recognized.

Example 8

Fumed alumina (Al$_2$O$_3$C made by Nippon Aerosil Co., Ltd.) was preliminarily dispersed for 15 kg in 1.8 kg of 1N nitric acid and 48.2 kg of ion exchange water while being sucked by Jet Stream Mixer TDS. Then, thus obtained preliminarily dispersed slurry were subjected to the main dispersion processing by using a high-pressure homogenizer provided with a single-crystal diamond dispersion unit (Ultimaizer Model HJP-30030 made by Sugino Machine Limited) under a pressure of 1,500 kg/cm$^2$.

Then, the above aqueous dispersion slurry of alumina was put into a pressure container having a capacity of 100 L, and passed once through a polypropylene depth cartridge filter having a cartridge length of 25 cm, a filter fiber (through which the fluid passes) thickness of 2 cm and a 2 $\mu$m particle removal ability of 99.9% or more (TCPD-02A made by Advantec Toyo Co., Ltd.) under a nitrogen pressure of 1.0 kg/cm$^2$.

The pH of thus obtained particles in the aqueous dispersion slurry of alumina were 4.1 and the average particle diameter thereof was 0.16 $\mu$m. The net number of particles thereof having a particle diameter of 1.3 $\mu$m or more per mL was obtained as described above as 18,000 in terms of a concentration of 30 wt %. The aqueous dispersion slurry were left at 25° C. for 30 days, but no viscous increase, no gelation or no sedimentation was recognized.

Example 9

While being sucked by Jet Stream Mixer TDS, 10 kg of metal evaporated and oxidized titanium dioxide (Nano-Tek, TiO$_2$ made by CI Chemical Co., Ltd.) was preliminarily dispersed in 65 kg of ion exchange water in which 500 g of 1N hydrochloric acid had been dissolved beforehand. Then, the aqueous dispersion slurry obtained by the above preliminary dispersion was subjected to the main dispersion processing at a feed rate of 0.5 L/min while being rotated at 3,000 rpm by a bead mill (Pearl Mill Model RL1 made by Ashizawa Co., Ltd.) with non-alkali glass having a diameter of 1 mm as a dispersion medium.

Then, the above aqueous dispersion slurry of titanium dioxide was put into a pressure container having a capacity of 100 L, and passed once through a polypropylene depth cartridge filter having a cartridge length of 25 cm, a filter fiber (through which the fluid passes) thickness of 2 cm and a 3 μm particle removal ability of 99.9% or more (Vector Series 5ARD10 made by Nippon Memtec Co., Ltd.) under a nitrogen pressure of 0.8 kg/cm$^2$.

The average particle diameter of thus obtained aqueous dispersion slurry of titanium dioxide was 0.12 μm, the net number of particles thereof having a particle diameter of 1.3 μm or more per mL was 38,000 in terms of a concentration of 30 wt %, and the pH thereof was 5. The aqueous dispersion slurry were left for 30 days at 25° C., but no viscous increase, no gelation or no sediment was recognized.

Example 10

Potassium hydroxide solution in which 60 g of potassium hydroxide were dissolved in 9 kg of ion exchange water was preliminarily dispersed while being stirred by a kneader (T. K. Hibis Disper Mix Model HDM-3D-20 made by Tokushu Kika Kogyo Co., Ltd.) and continuously adding with 5 kg of Aerosil #90 (made by Nippon Aerosil Co., Ltd.) for 3 hours. The mixture was further kneaded for 2 hours, and then added with ion exchange water to dilute the solid condensation to 30%.

Then, the above aqueous dispersion slurry of silica was put into a pressure container having a capacity of 20 L, and passed once through a polypropylene bag type filter having a surface area of 0.08 cm$^2$, a filter fiber (through which the fluid passes) thickness of 3 mm and a 1 μm particle removal ability of 99% or more (Accurate 1 Filter Bag ABPL made by ISP Japan Co., Ltd.) under an air pressure of 1.2 kg/cm$^2$.

The average particle diameter of thus obtained aqueous dispersion slurry of fumed silica was 0.19 μm, the net number of particles thereof having a particle diameter of 1.3 μm or more per mL was 85,000 in terms of a concentration of 30 wt %, and the pH thereof was 10, respectively. The aqueous dispersion slurry were left for 30 days at 25° C., but no viscous increase, no gelation or no sediment was recognized.

Reference Example 1

Reference Example 1 is aqueous dispersion slurry dispersed not by using the kneading method or filtration processing method but only by the high-pressure method. Here, the high-pressure method refers to a processing under a pressure of 500 kg/cm$^2$ by using a high-pressure homogenizer provided with a single-crystal diamond unit (Genus PY Model PRO2-15 made by Genus Co., Ltd.).

That is, preliminary dispersion was performed by putting 8 kg of ion exchange water into a polypropylene container having a capacity of 10 L, and stirring 2 kg of Aerosil #50 (fumed silica (silica dioxide) with a acrylic resin bar. Then, thus obtained preliminarily dispersed slurry was subjected once to the main dispersion processing by using a high-pressure homogenizer provided with a single-crystal diamond unit (Genus PY Model PRO2-15 made by Genus Co., Ltd.) under a pressure of 500 kg/cm$^2$. Then, thus obtained dispersion slurry was added with 0.1036 kg of potassium hydroxide solution having a concentration of 20 wt %. Then, thus obtained dispersion slurry was subjected once to another processing by using the high-pressure homogenizer to obtain the aqueous dispersion slurry of silicon dioxide.

The average particle diameter of the thus obtained aqueous dispersion slurry of silicon dioxide was 0.25 μm, and the pH thereof was 10.6.

The net number of particles of the aqueous dispersion slurry obtained as above having a particle diameter of 1.3 μm or more per mL was 240,000 in terms of a concentration of 30 wt % according to the counting method described above. Scratches were recognized, and the stable shelf life was so short that sedimentation was recognized in 7 days.

Reference Example 2

Except that the high-pressure method and the filtration processing were not performed, the aqueous dispersion slurry of fumed silica was formulated in the same way as Example 4.

The average particle diameter of the thus obtained aqueous dispersion slurry of silicon dioxide was 0.21 μm, and the pH thereof was 10.7.

The net number of particles of the aqueous dispersion slurry obtained as above having a particle diameter of 1.3 μm or more per mL was 470,000 in terms of a concentration of 30 wt % according to the counting method described above. Scratches were recognized, and the stable shelf life was so short that sedimentation was recognized in 3 days.

Reference Example 3

Except that the filtration processing was not performed, the aqueous dispersion slurry of fumed silica was formulated in the same way as Example 5.

The average particle diameter of the thus obtained aqueous dispersion slurry of silicon dioxide was 0.24 μm, and the pH thereof was 10.5.

The net number of particles of the aqueous dispersion slurry obtained as above having a particle diameter of 1.3 μm or more per mL was 190,000 in terms of a concentration of 30 wt % according to the counting method described above. Scratches were recognized, and the stable shelf life was so short that sedimentation was recognized in 7 days.

Reference Example 4

Except that a pleats cartridge filter (Ultipore MCY1001U030Z made by Nihon Poll Co., Ltd.) was used instead of the depth cartridge filter, the filtration processing was performed in the same way as Example 7. However, when the filtration processing was performed for 2 L, the filter was completely clogged and further processing was impossible.

Reference Example 5

Except that an acetate membrane cartridge filter (TCRO80 made by Advantec Toyo Co., Ltd.) was used instead of the depth cartridge filter, the filtration processing was performed in the same way as Example 8. However, when the filtration processing was performed for 1 L, the filter was completely clogged and further processing was impossible.

Reference Example 6

Except that a bag type filter having a uniform filter-structure (Standard Type Filter Bag PO10 made by ISP Japan Co., Ltd.) was used instead of the Accurate 1 Filter Bag ABP1, the filtration processing was performed in the same way as Example 10.

The average particle diameter of the obtained aqueous dispersion slurry of fumed silica was 0.19 μm. The net number of particles of the aqueous dispersion slurry obtained as above having a particle diameter of 1.3 μm or more per mL was 290,000 in terms of a concentration of 30 wt %.

The slurry was subjected to storage test at 25° C. for 30 days. As a result, sediment having a thickness of 1 mm was recognized at the bottom of the container, proving inferior stable shelf life.

TABLE 1

| | Solid Concentration in kneading (%) | Number of particles having a particle diameter of 1.3 μm, or more per mL in terms of 30 wt % | Stable shelf life | Scratches |
|---|---|---|---|---|
| Example | | | | |
| 1 | 50 | 160000 | 2 months or more | Not Recognized |
| 2 | 40 | 65000 | 2 months or more | Not Recognized |
| 3 | 45 | 43000 | 2 months or more | Not Recognized |
| 4 | 45 | 82000 | 2 months or more | Not Recognized |
| 5 | 50 | 64000 | 2 months or more | Not Recognized |
| 6 | 50 | 15000 | 2 months or more | Not Recognized |
| 7 | 20 | 95000 | 30 days or more | — |
| 8 | 23 | 18000 | 30 days or more | — |
| 9 | 13 | 38000 | 30 days or more | — |
| 10 | 36 | 85000 | 30 days or more | — |
| Reference example | | | | |
| 1 | — | 240000 | Sedimentation in 7 days | Recognized |
| 2 | 45 | 470000 | Sedimentation in 3 days | Recognized |
| 3 | 50 | 190000 | Sedimentation in 7 days | Recognized |
| 4 | 20 | X | X | — |
| 5 | 23 | X | X | — |
| 6 | 36 | 290000 | Sedimentation within 30 days | — |

What is claim is:

1. A production method for aqueous dispersion slurry of inorganic particles, wherein inorganic particles are added to and dispersed in an aqueous medium within a tank of a kneader which is of such a type that mixing blades rotate around respective subsidiary spindles and said subsidiary spindles revolve around a spindle. and filtrated through a depth type filter which is so designed that pore structure of a filter material is coarse on the inlet side of the filter and fine on the outlet side thereof and becomes finer from the inlet side of the filter toward the outlet side thereof with or without steps.

2. The production method for the aqueous dispersion slurry of inorganic particles according to claim 1, wherein the void of said filter material meaning a percentage of gap per unit cross-sectional area within a plane which crosses at right angles the passing direction of the fluid is uniform from the entry side of the fluid to the discharge side thereof.

* * * * *